United States Patent
Chen (12)

(10) Patent No.: US 6,371,523 B1
(45) Date of Patent: Apr. 16, 2002

(54) POSITION-RECOVERABLE PULLING DEVICE ADAPTED FOR USE IN A FITTING THAT COUPLES TWO TUBULAR MEMBERS

(76) Inventor: Waterson Chen, 8F, No. 428, Wu-Chuan-Nan Rd., Taichung City (TW)

(*) Notice: Subject to any disclaimer, the term of this patent is extended or adjusted under 35 U.S.C. 154(b) by 0 days.

(21) Appl. No.: 09/577,954

(22) Filed: May 24, 2000

(51) Int. Cl.[7] ............................ F16L 37/00; F16L 55/00
(52) U.S. Cl. .......................... 285/84; 285/85; 285/312
(58) Field of Search ......................... 285/84, 91, 312, 285/85

(56) References Cited

U.S. PATENT DOCUMENTS

| | | | | |
|---|---|---|---|---|
| 5,368,343 A | * | 11/1994 | Allen | 285/312 |
| 5,435,604 A | * | 7/1995 | Chen | 285/312 X |
| 6,015,168 A | * | 1/2000 | Fahl | 285/312 X |
| 6,206,431 B1 | * | 3/2001 | Street | 285/312 X |

* cited by examiner

Primary Examiner—Neill Wilson
(74) Attorney, Agent, or Firm—Cook, Alex, McFarron, Manzo, Cummings & Mehler, Ltd.

(57) ABSTRACT

A position-recoverable pulling device is adaptable for attachment to a lock bolt of a fitting for coupling two tubular members, and includes an anchoring member with a cam surface, and a coiled pulling member including a plurality of loops which are biased to abut against each other. The coiled pulling member is hooked on the anchoring member, while an outer segment thereof is disposed outboard to the cam surface. A bent portion of the outer segment is slidably contacted by a normal spot of the cam surface and is bent away from the adjacent loop to relieve the biasing action of the loops. Once the coiled pulling member has been swung to move the bent portion from the normal spot to reach a swung spot, the bent portion will be brought to slide back to the normal spot, thereby moving the coiled pulling member back to a normal position.

1 Claim, 5 Drawing Sheets

POSITION-RECOVERABLE PULLING DEVICE ADAPTED FOR USE IN A FITTING THAT COUPLES TWO TUBULAR MEMBERS

BACKGROUND OF THE INVENTION

1. Field of the Invention

This invention relates to a fitting for coupling two tubular members, more particularly to a position-recoverable pulling device adapted for use in a fitting that couples two tubular members.

2. Description of the Related Art

Referring to FIG. 1, a conventional fitting for coupling two tubular members (not shown) is shown to have an annular coupling body 10 with a locking bore 101 which extends downwardly, and a pressing lever 12 with a pivoted end portion 121 which is pivotally mounted on the coupling body 10, an actuating end portion 123 which is turnable between locked and unlocked positions where the actuating end portion 123 is closer to and remote from the coupling body 10, respectively, and a lock body 124 with a chamber 122 and a spring-loaded lock bolt 13 which is received in the chamber 122 and which is movable relative to the lock body 124 longitudinally. The lock body 124 has an upper locking end 131 which extends upwardly and outwardly of the lock body 124 and which is urged to move into and to be retained within the locking bore 101, and a lower pulled end which extends downwardly and outwardly of the lock body 124 and which is provided with an anchoring member 133 with an anchoring hole 132 for engaging a coiled pulling member 15. By pulling the coiled pulling member 15, the lock bolt 13 is pulled downward to detach the upper locking end 131 from the locking bore 101 so as to permit turning of the actuating end portion 123 of the pressing lever 12 to the unlocked position.

Since the coiled pulling member 15 is hung on the anchoring member 133, when the fitting is mounted on two tubular members which are in an inclined state, the coiled pulling member 15 will incline and is not in line with the lock bolt 13 due to its weight. Thus, it is required to adjust the position of the coiled pulling member 15 to register with the lock bolt 13 for pulling when unlocking the pressing lever 12, thereby resulting in inconvenient operation thereof.

SUMMARY OF THE INVENTION

The object of the present invention is to provide a position-recoverable pulling device which is adapted for use in a fitting and which is position-recoverable to be in line with a lock bolt of the fitting when the fitting is inclined.

According to this invention, the position-recoverable pulling device includes an anchoring member and a coiled pulling member. The anchoring member includes front and rear walls opposite to each other in a first transverse direction. The front wall has an anchoring hole which extends in the first transverse direction to communicate with the rear wall and which defines a hole axis. Upper and lower end walls are disposed opposite to each other in a longitudinal direction at opposite sides of a middle line that is aligned with a chord line of the anchoring hole which is transverse to both the hole axis and the longitudinal direction. The upper end wall is adapted to be attached to a lower pulled end of a spring-loaded lock bolt of a fitting such that the hole axis crosses a bore axis of a coupling body of the fitting. Right and left lateral walls are disposed opposite to each other in a second transverse direction which is transverse to both the longitudinal direction and the first transverse direction. At least one of the right and left lateral walls has a cam surface which includes a normal spot that is distal to both of the upper and lower end walls, and that is the closest to the hole axis in terms of radial direction, and a swung spot that is proximate to one of the upper and lower end walls and that is farther from the hole axis than the normal spot in terms of the radial direction. The coiled pulling member is made of a resilient material, and includes a plurality of loops defining a loop axis. The adjacent ones of the loops are biased to abut against each other in a direction parallel to the loop axis. The coiled pulling member includes a leading end and a tail end, and is brought to be hooked on the anchoring member by inserting at least one of loops into the anchoring member with a cross sectioned area thereof disposed within the anchoring hole, while one of the leading and tail ends is pulled in the parallel direction away from an adjacent one of the loops against biasing action of the pulling member such that an outer segment proximate to one of the leading and tail ends is disposed outboard to a respective one of the right and left lateral walls. The outer segment has a bent portion which is localized at and slidably contacted by the normal spot in a normal position of the coiled pulling member where the loop axis is parallel to the middle line, and which is bent away from the adjacent one of the loops in the parallel direction so as to relieve the biasing action in the parallel direction to render the bent portion to act as a follower that follows the contour of the cam surface. Once the coiled pulling member has been swung to move the bent portion to reach the swung spot against the biasing action, the bent portion will be brought to slide back to the normal spot, thereby bringing the coiled pulling member to move back to the normal position.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 1:
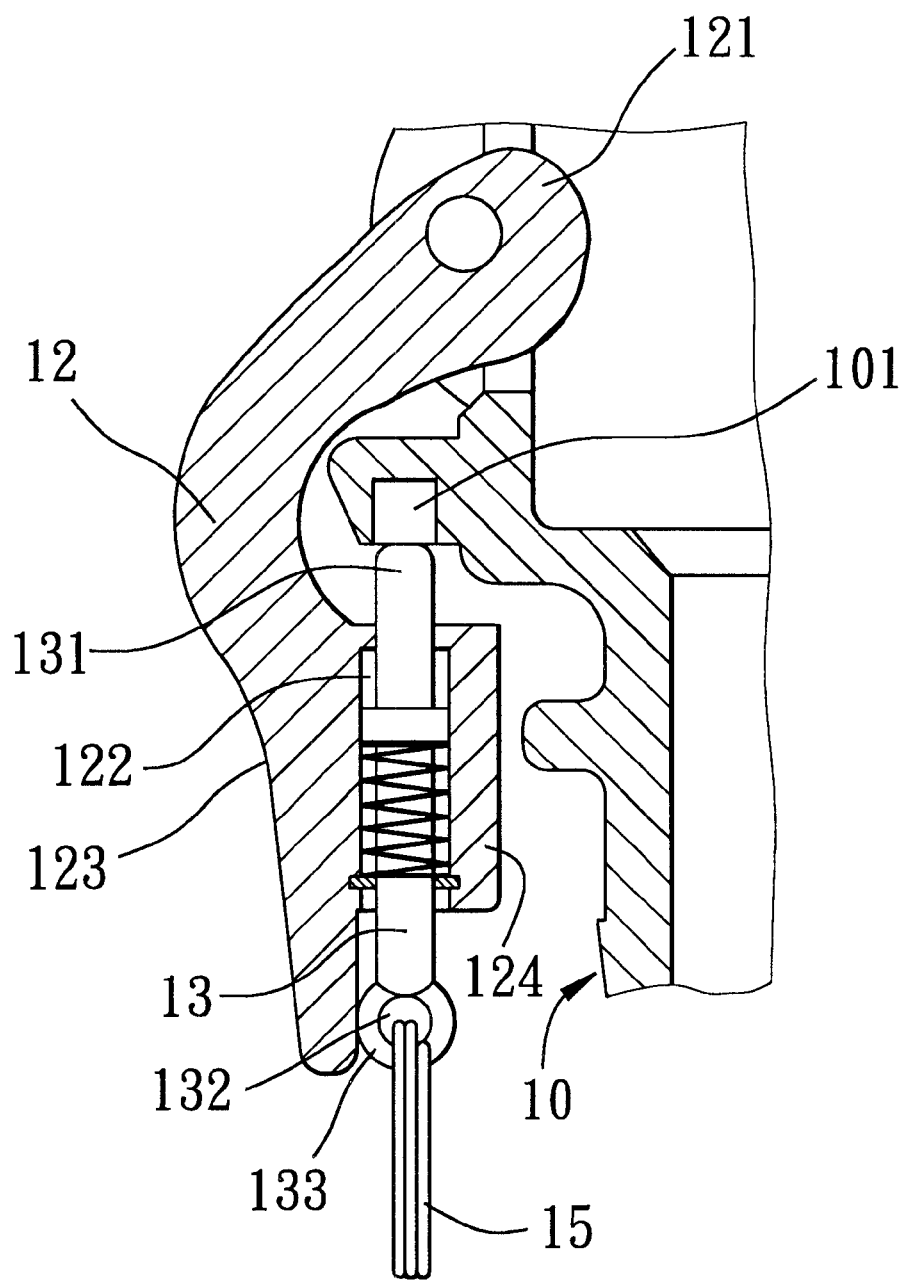
FIG. 1 is a sectional schematic view of a conventional fitting in use.
Figure 2:
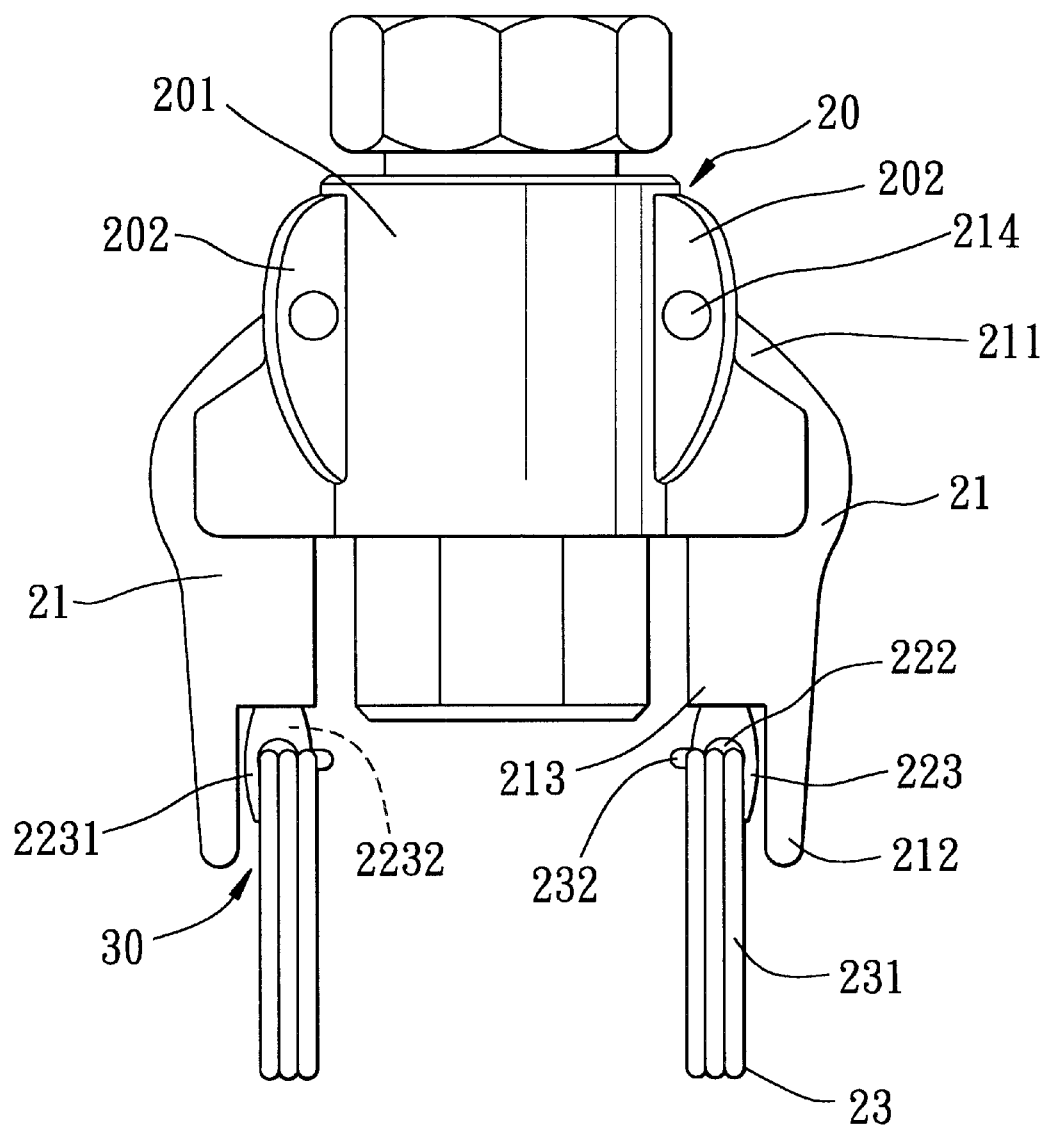
FIG. 2 is a side schematic view showing a preferred embodiment of a position-recoverable pulling device according to this invention when mounted on a pressing lever of a fitting.
Figure 3:
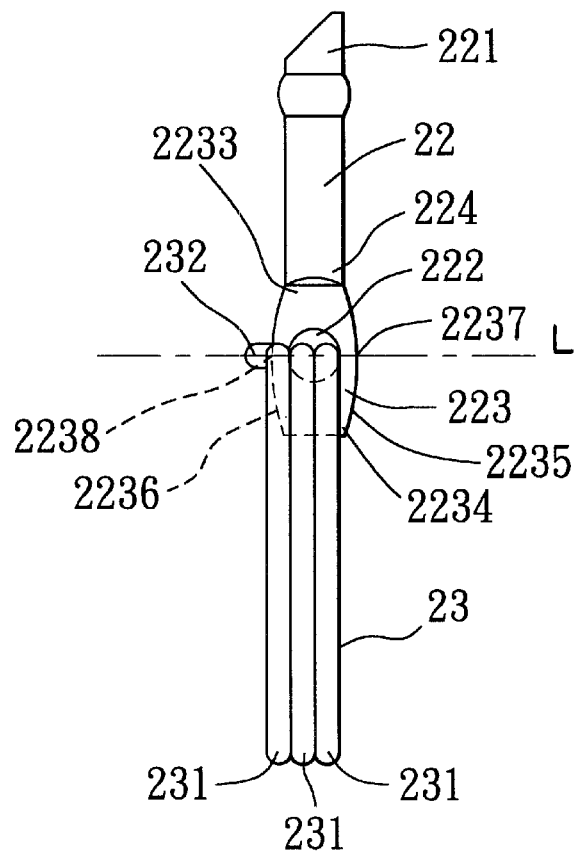
FIG. 3 is a side schematic view of a preferred embodiment of a position-recoverable pulling device according to this invention.
Figure 4:
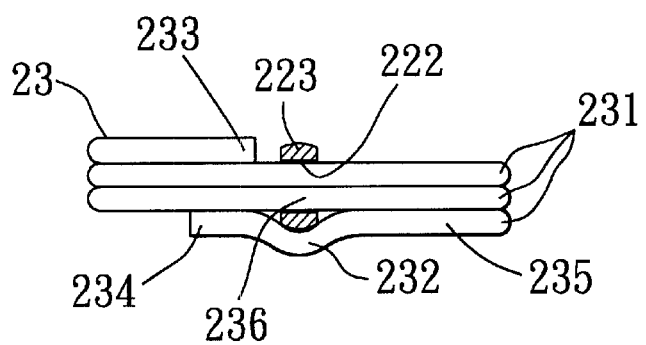
FIG. 4 is a cross-sectional view of the preferred embodiment.

Referring to FIGS. 2, 3 and 4, the preferred embodiment of the position-recoverable pulling device 30 according to the present invention is shown to be used in a fitting. The fitting is similar to the fitting shown in FIG. 1, and includes an annular coupling body 20 which is interposed between and which is in fluid communication with first and second tubular members (not shown) along a first axis. The annular coupling body 20 has an outer annular wall 201. Each ear portion 202 surrounds the first axis, and a pair of ear portions 202 which extend radially and outwardly from the outer annular wall 201, and each of which defines a locking bore (not shown) that extends downwardly and along a second axis parallel to the first axis. Each of two pressing levers 21 has a pivoted end portion 211 which is pivotally mounted on the annular coupling body 20 at a pivot point 214 about a pivot axis that is transverse to the first axis and proximate to the first tubular member, an actuating end portion 212 which is distal to and turnable about the pivot point 214 between a locked position where the actuating end portion 212 is closer to the second tubular member, and an unlocked position where the actuating end portion 212 is remote from the second tubular member, and a lock body 213 which extends transversely from the actuating end portion 212. When the pressing lever 21 is moved to the locked position, the lock body 213 is brought to be spaced apart from and to be in line with the respective ear portion 202 along the second axis. The lock body 213 has a chamber (not shown) which extends along the second axis, and a spring loaded lock bolt 22 which is received in the chamber and which is movable relative to the lock body 213 along the second axis. The lock bolt 22 has an upper locking end 221 which extends upwardly and outwardly of the lock body 213 and which is urged to move into and to be retained within the locking bore, and a lower pulled end 224 which is disposed opposite to the upper locking end 221 along the second axis and which extends downwardly and outwardly of the lock body 213.

The position-recoverable pulling device 30 includes an anchoring member 223 and a coiled pulling member 23.

As shown in FIGS. 2 and 3, the anchoring member 223 includes front and rear walls 2231,2232 opposite to each other in a first transverse direction. The front wall 2231 has an anchoring hole 222 which extends in the first transverse direction to communicate with the rear wall 2232, and which defines a third axis. Upper and lower end walls 2233,2234 are disposed opposite to each other in a longitudinal direction at opposite sides of a middle line (L) which is aligned with a chord line of the anchoring hole 222 that is transverse to both the third axis and the longitudinal direction. The upper end wall 2233 is adapted to be attached to the lower pulled end 224 of the lock bolt 22 such that the third axis crosses the second axis. Right and left lateral walls 2235, 2236 are disposed opposite to each other in a second transverse direction which is transverse to both the longitudinal direction and the first transverse direction. Each of the right and left lateral walls 2235,2236 has a cam surface which includes a normal spot 2237,2238 that is distal to both of the upper and lower end walls 2233,2234, and that is the closest to the third axis in terms of radial direction, and a swung spot that is proximate to one of the upper and lower end walls 2233,2234 and that is farther from the third axis than the normal spot 2237,2238 in terms of the radial direction.

Figure 5:
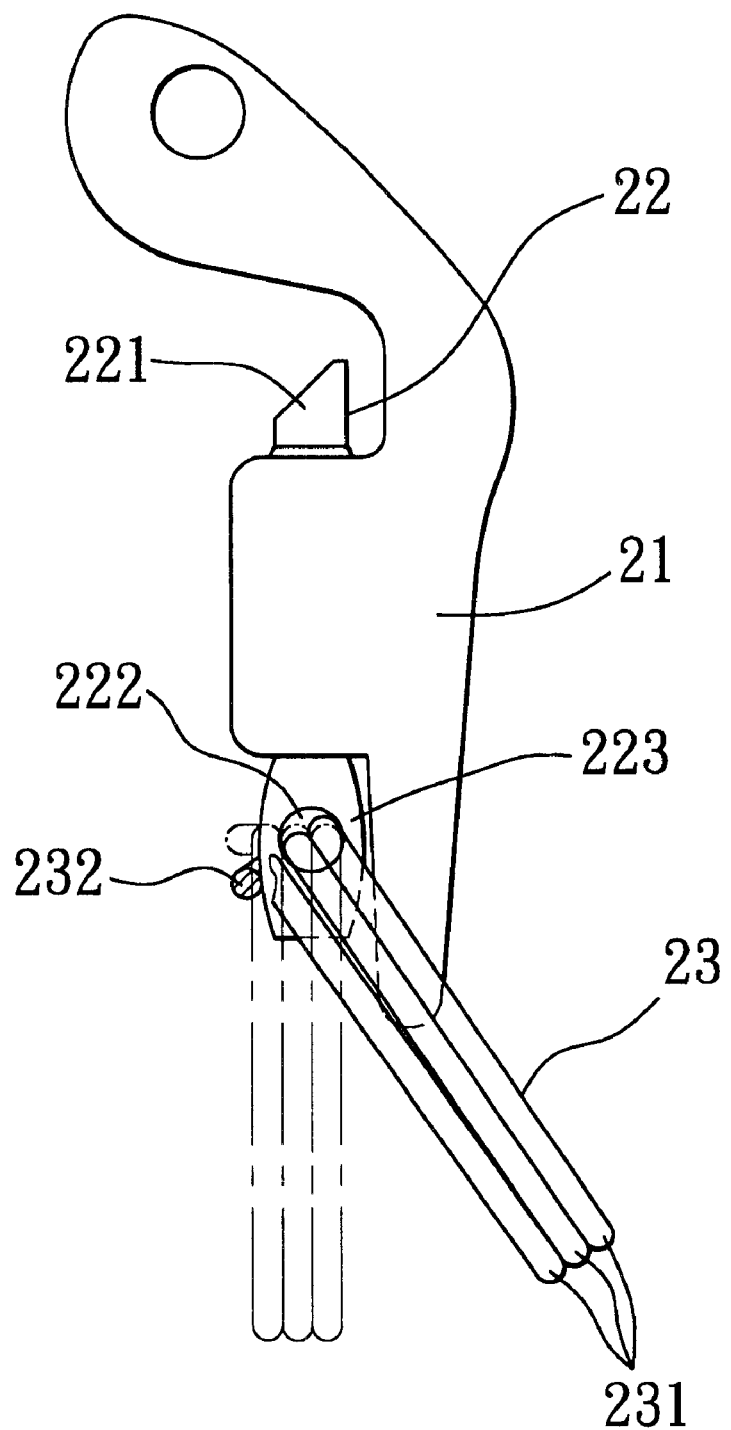
FIGS. 5 and 6 are schematic views showing the preferred embodiment in use.
Figure 6:
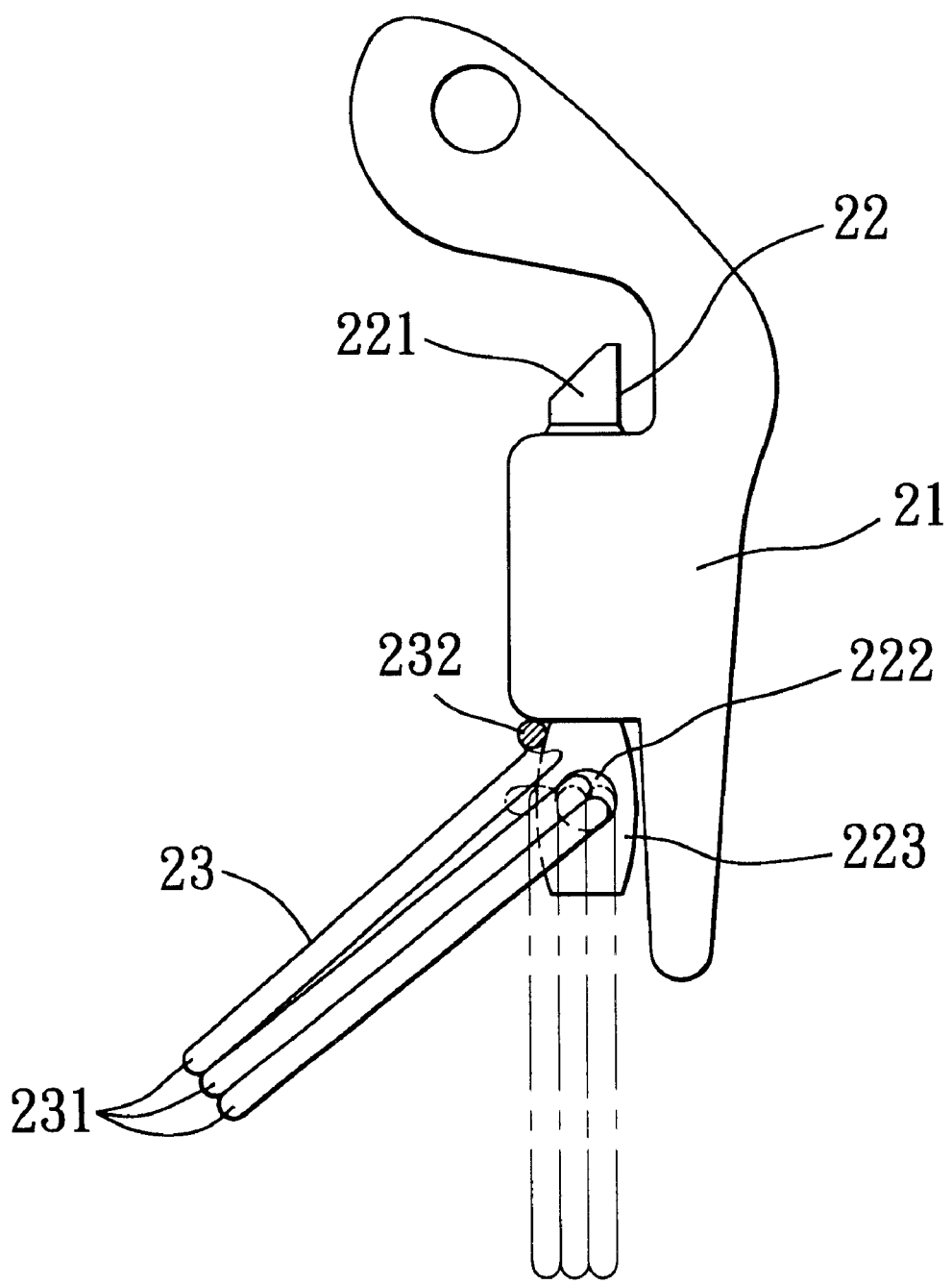

As shown in FIGS. 3 and 4, the coiled pulling member 23 is made of a resilient material, and includes a plurality of loops 231 (there are three loops 231 in this preferred embodiment) which define a fourth axis. Adjacent ones of the loops 231 are biased to abut against each other in a direction parallel to the fourth axis. The coiled pulling member 23 includes a leading end 233 and a tail end 234, and is brought to be hooked on the anchoring member 223 by inserting two loops 231 into the anchoring hole 222 with two cross sectioned areas 236 thereof disposed within the anchoring hole 222, while the tail end 234 is pulled in the parallel direction away from the adjacent loop 231 against the biasing action of the coiled pulling member 23 such that an outer segment 235 proximate to the tail end 234 is disposed outboard to the corresponding one of the right and left lateral walls 2235,2236 (e.g. the left lateral wall 2236 in this preferred embodiment). The outer segment 235 has a bent portion 232. In a normal position of the coiled pulling member 23 where the fourth axis is parallel to the middle line (L), the bent portion 232 is localized at and slidably contacted by the normal spot 2238 of the left lateral wall 2236, as shown in FIG. 3. The bent portion 232 is bent away from the adjacent loop 231 in the parallel direction so as to somewhat relieve the biasing action in the parallel direction to render the bent portion 232 to act as a follower that follows the contour of the cam surface of the left lateral wall 2236. As such, referring to FIGS. 5 and 6, once the fitting on which the position-recoverable pulling device is mounted is inclined such that the coiled pulling member 23 is swung to move the bent portion 232 to reach the swung spot against the biasing action due to the weight of the coiled pulling member 23 (indicated by the solid lines), the biasing action will bring the bent portion 232 to slide back to the normal spot 2238, thereby bringing the coiled pulling member 23 to move back to the normal position (indicated by the dotted lines). As such, enhanced convenience results when pulling the lock bolt 22 for actuating the pressing lever 21.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

I claim:

1. A position-recoverable pulling device adapted for use in a fitting which is to couple sealingly a first tubular member with a second tubular member that is spaced apart from and that is aligned with the first tubular member along a first axis, so as to permit fluid communication therebetween without leakage, the fitting including an annular coupling body interposed between and in fluid communication with the first and second tubular members along the first axis, the annular coupling body having an outer annular wall surrounding the first axis, and an ear portion extending radially and outwardly from the outer annular wall, and defining a locking bore extending downwardly and along a second axis which is parallel to the first axis, a pressing lever having a pivoted end portion pivotally mounted on the annular coupling body at a pivot point about a pivot axis which is transverse to the first axis and proximate to the first tubular member, an actuating end portion distal to and turnable about the pivot point between a locked position where the actuating end portion is closer to the second tubular member, and an unlocked position where the actuating end portion is remote from the second tubular member, and a lock body extending transversely from the actuating end portion such that when the pressing lever is moved to the locked position, the lock body is brought to be spaced apart from and to be in line with the ear portion along the second axis, the lock body having a chamber extending along the second axis, and a spring-loaded lock bolt received in the chamber and movable relative to the lock body along the second axis, the lock bolt having an upper locking end extending upwardly and outwardly of the lock body and urged to move into and to be retained within the locking bore, and a lower pulled end disposed opposite to the upper locking end along the second axis, and extending downwardly and outwardly of the lock body, said position-recoverable pulling device comprising:

an anchoring member including front and rear walls opposite to each other in a first transverse direction, said front wall having an anchoring hole extending in the first transverse direction to communicate with said rear wall, and defining a third axis, upper and lower end walls opposite to each other in a longitudinal direction, and disposed at opposite sides of a middle line that is aligned with a chord line of said anchoring hole which is transverse to both the third axis and the longitudinal direction, said upper end wall being adapted to be attached to the lower pulled end of the lock bolt such that the third axis crosses the second axis, and right and left lateral walls opposite to each other in a second transverse direction which is transverse to both the longitudinal direction and the first transverse direction, at least one of said right and left lateral walls having a cam surface which includes a normal spot that is distal to both of said upper and lower end walls, and that is the closest to the third axis in terms of radial direction, and a swung spot that is proximate to one of said upper and lower end walls and that is farther from the third axis than said normal spot in terms of the radial direction; and a coiled pulling member made of a resilient material, and including a plurality of loops defining a fourth axis, adjacent ones of said loops being biased to abut against each other in a direction parallel to the fourth axis, said coiled pulling member including a leading end and a tail end, and being brought to be hooked on said anchoring member by inserting at least one of loops into said anchoring member with a cross sectioned area thereof disposed within said anchoring hole, while one of said leading and tail ends is pulled in the parallel direction away from an adjacent one of said loops against biasing action of said coiled pulling member such that an outer segment proximate to said one of said leading and tail ends is disposed outboard to a respective one of said right and left lateral walls, said outer segment having a bent portion which is, in a normal position of said coiled pulling member where the fourth axis is parallel to the middle line, localized at and slidably contacted by the normal spot, and which is bent away from said adjacent one of said loops in the parallel direction so as to relieve the biasing action in the parallel direction to render said bent portion to act as a follower that follows contour of said cam surface such that once said coiled pulling member has been swung to move said bent portion to reach the swung spot against the biasing action, said bent portion will be brought to slide back to the normal spot, thereby bringing said coiled pulling member to move back to the normal position.

* * * * *